US006992408B2

(12) United States Patent
Finkbeiner et al.

(10) Patent No.: US 6,992,408 B2
(45) Date of Patent: Jan. 31, 2006

(54) LINEAR DRIVE DEVICE

(75) Inventors: Matthias Finkbeiner, Mötzingen (DE); Thomas Feyrer, Esslingen (DE); Rüdiger Neumann, Ostfildern (DE); Armin Hartmann, Ostfildern (DE)

(73) Assignee: Festo AG & Co., Esslingen (DE)

( * ) Notice: Subject to any disclaimer, the term of this patent is extended or adjusted under 35 U.S.C. 154(b) by 178 days.

(21) Appl. No.: 10/663,334

(22) Filed: Sep. 16, 2003

(65) Prior Publication Data
US 2004/0056536 A1 Mar. 25, 2004

(30) Foreign Application Priority Data
Sep. 24, 2002 (DE) ................. 102 44 260

(51) Int. Cl.
*H02K 41/00* (2006.01)
(52) U.S. Cl. ...................................... 310/12
(58) Field of Classification Search ............ 310/12–14
See application file for complete search history.

(56) References Cited

U.S. PATENT DOCUMENTS 4,353,426 A * 10/1982 Ward ..................... 173/202
4,368,396 A * 1/1983 Humphrey ................ 310/27
5,440,183 A 8/1995 Denne ..................... 310/12
5,590,580 A 1/1997 Nagai ..................... 92/33
5,605,462 A 2/1997 Denne ..................... 434/55

FOREIGN PATENT DOCUMENTS

| DE | 692 25 972 T2 | 1/1993 |
| DE | 198 53 942 C1 | 7/2000 |
| DE | 100 46 535 A1 | 3/2001 |
| DE | 195 03 145 C2 | 10/2001 |
| DE | 201 13 014 U1 | 11/2001 |
| EP | 1 150 416 A1 | 10/2001 |
| WO | WO 93/01646 | 1/1993 |
| WO | WO 98/25032 | 6/1998 |
| WO | WO 99/14724 | 3/1999 |

* cited by examiner

*Primary Examiner*—Darren Schuberg
*Assistant Examiner*—Judson H. Jones
(74) *Attorney, Agent, or Firm*—Hoffmann & Baron, LLP

(57) ABSTRACT

A linear drive device has a stator and an armature able to be moved in relation to the stator in a linear manner. The device furthermore comprises an electrodynamic linear direct drive system and a fluid power drive system. Using the two drive systems it is possible in an independent manner for setting forces to be applied electrodynamically and by fluid power to the armature.

22 Claims, 2 Drawing Sheets

Figure 3:
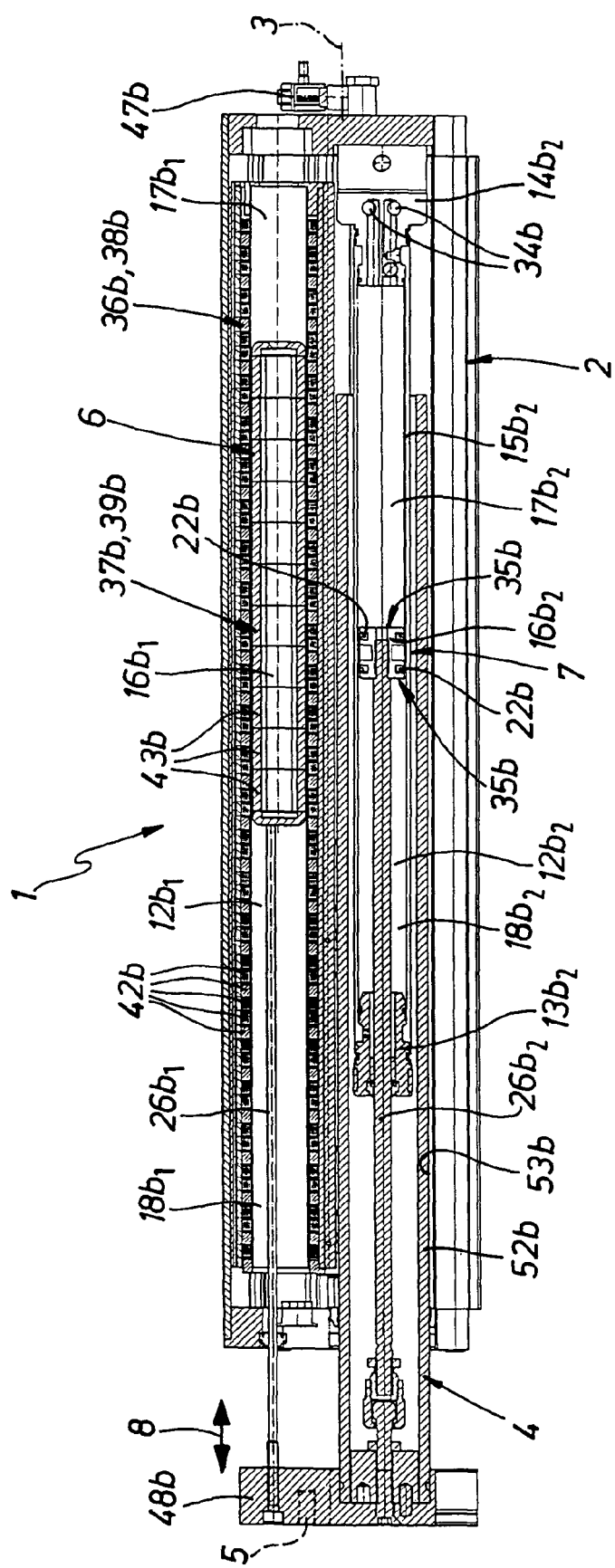

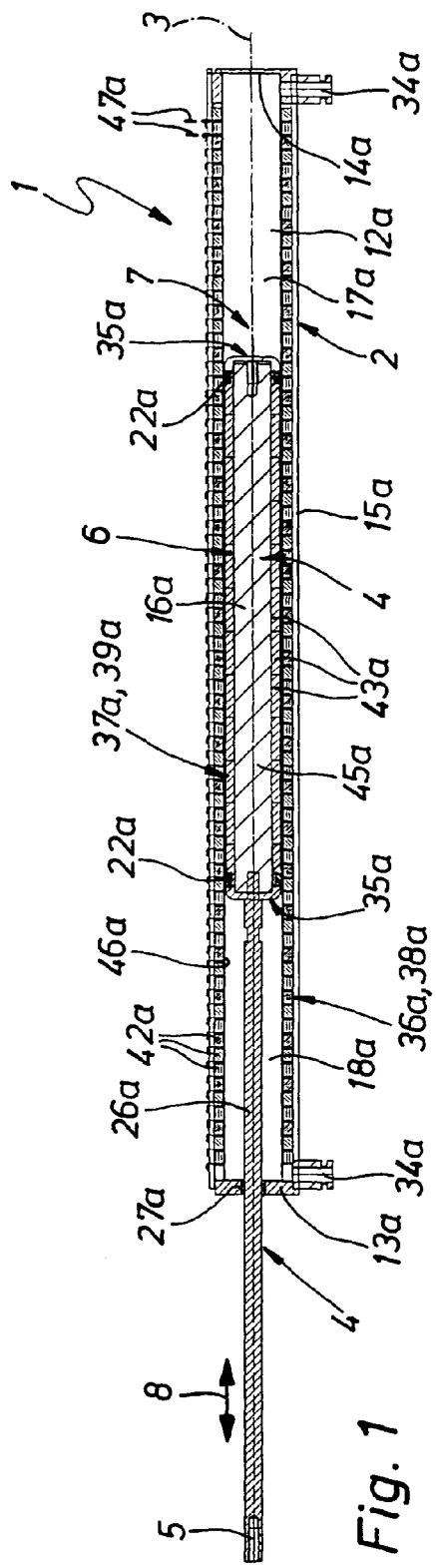
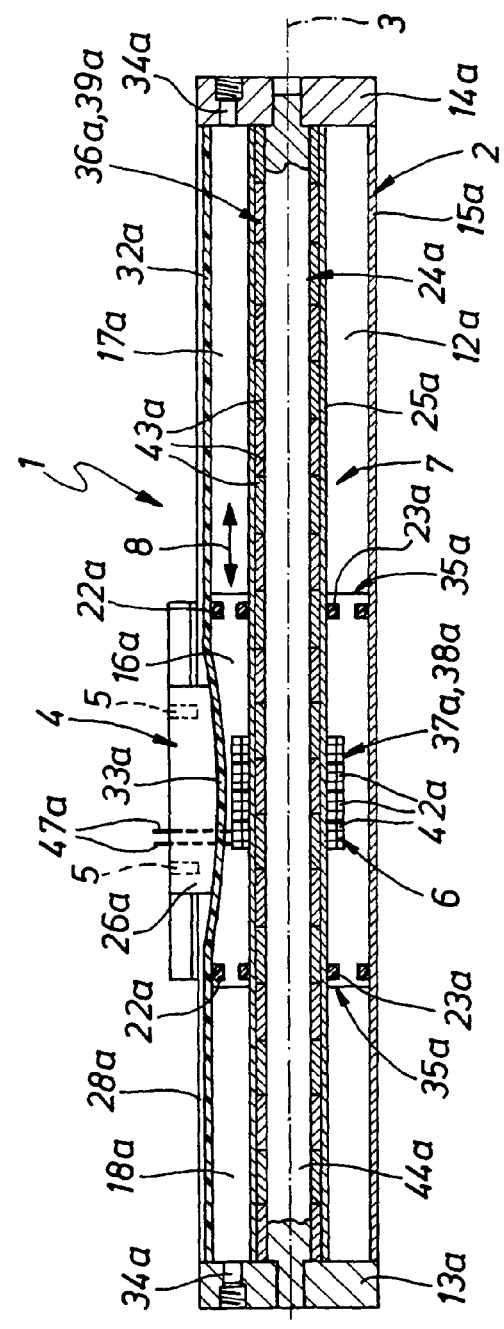

LINEAR DRIVE DEVICE

BACKGROUND OF THE INVENTION

The invention relates to a linear drive device comprising a stator and an armature able to be moved linearly in relation to the stator and an electrodynamic linear direct drive system, composed of two drivingly cooperating drive means in the form of a coil means having a plurality of coaxially sequentially arranged drive coils and of a magnet means with one or more axially sequentially arranged permanent magnets, of which the one is arranged on the stator and the other is arranged on the armature and by which the armature may be subjected to a first setting force.

THE PRIOR ART

A linear drive device of this type is disclosed for example in the German patent publication 20,113,014 (utility model). In this case it consists only of a linear direct drive, which comprises a stator constituted by a housing, in which the armature is arranged for linear motion. The armature is annular in structure and is provided with a coil means, it surrounding a stator rod having magnet system.

If the coil means is supplied with a switched exciting voltage, a travelling magnetic field results, which exerts a first setting force on the armature, which is accordingly displaced in a direction of movement in relation to the stator in order to shift a component.

A similar linear drive device is described in the European patent publication 1 150 416 A1. In this case however the coil means is arranged on the stator and the magnet means is arranged on the armature.

An electrical linear drive with a similar structure is also disclosed in the German patent publication 19,853,942 C1.

All these linear drive devices do share the feature that they render possible an exact operation of the armature and accordingly of the components connected with it. They are particularly suitable for moving small loads extremely dynamically and exactly. For a short time very high setting forces may be produced. However there is the problem that only relatively low continuous hold forces are available. If loads are to be held for long periods of time or moved along a long distance, the drive system heats up and can therefore only be employed to provide the hold force.

SHORT SUMMARY OF THE INVENTION

One object of the present invention is to create a linear drive device which both provides for very dynamic and accurate operation and furthermore may supply high holding forces as well.

In order to achieve these and/or other objects appearing from the present specification, claims and drawings, in the present invention the linear drive device is provided additionally with a fluid power drive system, which renders possible fluid actuation of the armature for the production of a second setting force independent of the first setting force.

This means that a linear drive device is provided which combines the advantages of an electrodynamic linear direct drive with a fluid power linear drive. Owing to the linear direct drive system high accelerations and exact positioning are still possible. Owing to the additionally present fluid power drive system furthermore extremely high setting forces may be produced given suitable fluid actuation, this rendering it possible to hold heavy loads for long periods of time or to displace them over long distances. In this respect the first and the second setting forces may be applied, dependent on customization or type of control alternatively or simultaneously, and in the same or in opposite directions. For instance, the fluid power drive system may emulate the functionality of a pneumatic spring or a constant control of pressure may be provided for in order to hold a load suspended. Furthermore, servo-pneumatic operation is possible, in the case of which the fluid pressure and accordingly the loads able to be handled and the dynamics thereof may be controlled as required.

Although the German patent publication 19,503,145 C2 has already disclosed a linear drive device wherein the functions of a fluid power linear drive and an electrical spindle drive are combined, this drive combination gives rise to problems more particularly as regards seals between the armature and the drive spindle.

Furthermore, the drive spindle constantly rotates owing to the linear movement of the armature caused by the fluid force or power, something which impairs dynamic behavior and causes substantial friction likely to lead to premature wear. On the contrary an electrodynamic linear direct drive system is as a rule characterized by smooth surfaces and by the absence of an interlocking coupling between the stator and the armature so that operation of the fluid power drive systems is not impaired by the linear direct drive system also present.

Further advantageous developments of the invention are defined in the claims.

In the case of a preferred design an elongated receiving space is present in the stator, wherein a drive output part of the armature is arranged for linear setting in position, such part possessing both one of the drive means of the linear direct drive and also at least one axially aligned actuating face provided for controlled fluid actuation. Accordingly both the electrical and also fluid power drive functions are combined in the drive output part, something which definitely provides for compact dimensions of the overall arrangement.

In the case of an alternative design the linear drive device possesses two separate drive output parts, of which one belongs to the linear direct drive system and the other to the fluid power drive system. Such a functional separation offers the advantage that the two system components may be optimized irrespectively of each other. Owing to the kinematic coupling there is furthermore the possibility of the desired output of power or force accompanied by the above mentioned advantages.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 1 shows one possible first design of the linear drive device in accordance with the invention in a longitudinal section.

FIG. 2 again shows a longitudinal section of a further possible embodiment of the linear drive device.

FIG. 3 shows a third form of the linear drive device, in the case of which the electromagnetic drive force and the fluid drive power are provided at separate output drive parts and not as in the embodiments of FIGS. 1 and 2.

DETAILED ACCOUNT OF WORKING EMBODIMENTS OF THE INVENTION

The linear drive devices generally referenced 1 each comprise an elongated 2 stator and an armature 4 moving linearly in relation to the stator 2 in the direction of its longitudinal axis 3. On the armature 4, clear of the stator 2, attachment means 5 of any suitable type are provided, by way of which components to be moved may be attached to armature 4.

The linear drive devices 1 are each provided with an electrodynamic linear direct drive system 6 and furthermore with a fluid power drive system 7. Using the linear direct drive system 6 it is possible for the armature 4 to be subjected to a first setting force, which is due to the effect of electromagnetic or, respectively, electrodynamic action. Owing to the fluid power drive system 7 it is possible for the armature 4 to be subjected to a second setting force, which is due to the fluid actuation of the armature 4. Thus the armature 4 may be acted upon by two independent first and second setting forces in order to cause a linear movement 8 indicated by a double arrow and to halt the armature 4 as required at a certain position.

The direction of action of the setting forces and their timing may be selected as required. It is in this manner that it is for example possible to have a unidirectional actuation of the armature 4 so that the setting forces are summated in the one or the other direction for shifting or conveying particularly heavy loads or to achieve high speeds of shifting. Furthermore, oppositely directed setting forces are possible in order, for example, to retard armatures moving at a high speed or in order to hold the armature 4 at a predetermined position in relation to the stator 2. Moreover the setting forces may be so applied that at a given time only setting force takes effect.

The integration of the two drive systems in one and the same linear drive device 1 renders possible extremely compact dimensions, there being then a hybrid drive as it were, which unites the advantages of the two drive systems in an ideal fashion. The dimensions of the linear drive device 1 are not greater or are only slightly greater than those of an exclusively electrodynamic or fluid power linear drive.

In the following details will be provided of different embodiments illustrated in the drawings.

Firstly with reference to the designs of FIGS. 1 and 2 the reader will see that in each case a stator 2 is provided, which has an elongated receiving space 12a inside it. The receiving space 12a is terminally provided with a first and, respectively, a second terminal wall 13a and 14a and is surrounded by a peripheral wall 15a.

In the interior of the receiving space 12 there is an drive output part 16a belonging to the armature 4, which is preferably piston-like in its configuration and divides the receiving space 12a in a sealing manner into axially sequentially placed first and second space parts 17a and 18a.

In order to provide for an fluid-tight separation of the two space parts 17a and 18a the drive output part 16a is at its periphery provided with annular first sealing means 22a, which engage the inner face of the peripheral wall 15a in a sealing manner.

The drive output part 16a in accordance with FIG. 1 occupies the entire cross section of the receiving space 12a. Further sealing means to provide a fluid-tight separation of the two space parts 17a and 18a are hence unnecessary.

In the working example of FIG. 2 on the other hand the drive output part 16a has an annular cross section. It has a rod-like structure, termed a stator rod 24a, extending more particularly coaxially through it, which extends in the interior of the receiving space 12 in the direction of the longitudinal axis 3 between the two terminal walls 13a and 14a. The stator rod 24a is secured in position at the two terminal walls 13a and 14a.

In order to prevent the passage of fluid between the drive output part 16a and the stator rod 24a the drive output part 16a is additionally provided with second sealing means 23a, which coaxially surround the stator rod 24a and contact the outer peripheral face thereof in a sealing fashion. The outer peripheral face of the stator rod 24a is in this case preferably constituted by an externally smooth sleeve slide 25a.

The drive output part 16a is kinematically coupled respectively with at least one force output member 26a of the armature 4. Outside the receiving space 12a this renders possible the output or tapping of force or power. The output of force takes place at the attachment means 5, which are provided externally of the stator 2 at the force output member 26a.

In the working embodiment illustrated in FIG. 1 the force output member 26a is rod-like in configuration. At one end it extends away from the drive output part 16a, it extending in a sealing manner outward through the associated space part 18a and the terminal wall 13a delimiting same. Third sealing means, which are arranged at the respective terminal wall 13a and surround the force output member 26a, are indicated at 27a.

In the working embodiment illustrated in FIG. 2 the force output member 26a extending from the drive output part 16a does not extend in the axial direction but laterally athwart the longitudinal axis 3 of the stator 2. It extends through a longitudinal slot 28a in the peripheral wall 15a, which preferably extends along the full length of the peripheral wall 15a and locally severs the peripheral wall 15a in a radial direction. The extension through the longitudinal slot 28a is preferably at a rib-like section of the force output member 26a.

The force output member 26a can be guided for sliding movement at a portion of the outer face of the stator 2 by means of a linear guide means, not illustrated in detail. The section outside the stator 2 of the force output member 26a may be more particularly designed in the form of a table or slide.

If the drive output part 16a is shifted in the one or the other direction linearly, such motion will be synchronously followed by the force output member 26a and the attachment means 5 arranged thereon.

The two space parts 17a and 18a are at the longitudinal slot 28a sealed off by at least one flexible sealing tape 32a extending along the longitudinal slot 28a, such tape making sealing contact with the flanks of the slot. At the same level as the drive output part 16a the sealing tape 32a is lifted clear of the longitudinal slot 28a radially inward by suitable guide means on the armature 4 so that the passage of the force output member 28a may take place. On the drive output part 16a mutually spaced apart first sealing means 22a are provided, the lifted section 33a of the sealing tape 32a lying between these two first sealing means 22a.

Accordingly it is possible to ensure that even in the case of the configuration in accordance with FIG. 2 both space parts 17a and 18a are at all times sealed off from the surroundings irrespectively of the instantaneous axial position of the armature 4.

The two space parts 17a and 18a are respectively adapted for controlled fluid actuation. Into each space part 17a and 18a there opens a fluid duct 34a, by way of which a fluid pressure medium, as for instance compressed air or a hydraulic medium may be supplied and let off. The supply and removal is controlled by a valve means, not illustrated, which for its part is driven by an electronic control means, not illustrated either.

The two terminal faces of the drive output part 16a facing a respective space part 17a and 18a, each constitute an actuating face 35a. The fluid entering the one space part 17a and 18a acts on the associated actuating face 35a and thus produces the above mentioned second setting force acting on the stator 4, in the case of which it is a question of a fluid force.

Departing from the illustrated working example it would be possible for merely one of the space parts 17a and 18a to be provided for controlled fluid actuation. The other space part would in this case be more especially constantly connected with the atmosphere.

The two space parts 17a and 18a, the two fluid actuation faces 35a and the two fluid ducts 34a accordingly belong to the above mentioned fluid power drive system 7, using which a fluid-produced second setting force may be exerted.

The linear direct drive system 6 includes two drivingly cooperating drive means, of which the one, first drive means 36a is arranged on the stator 2 and the other, second drive means 37a is arranged on the armature 4. One of these drive means—in the working example of FIG. 1, the first drive means 36a and in the working example of FIG. 2 the second drive means 37a—is constituted by a coil means 38a, which comprises a plurality of sequentially following drive coils 42a. The respectively other drive means is constituted by a magnet means 39a, which possesses one or preferably a plurality of axially sequentially placed permanent magnets 43a. The permanent magnets 43a are preferably annular in design. Preferably there is a radial magnetization of the permanent magnets 43a, directly adjacent permanent magnets 43a having an opposite magnetization to one another.

In the working embodiment illustrated in FIG. 2 the magnet means 39a is a component of the stator rod 24a. The latter preferably comprises a carrier rod 44a consisting of solid material or which is at least partly hollow, on which the permanent magnets 43a, which in the working example are in the form of annular magnets, are seated coaxially in a row. In order to act as a magnetic return path the carrier rod 44a must consist of magnetically conductive material. Furthermore, the carrier rod 44a preferably serves for terminally securing the stator rod 24a. The sleeve slide 25a surrounds the magnet means 39a coaxially.

In the working embodiment illustrated in FIG. 1 the permanent magnets 43a, which are preferably also annular in form, are seated on a core body 45a of the drive output part 16a. If required they could also be surrounded by a sleeve slide.

The coil means 38a is coaxial to the magnet means 39a in both working examples. In the working embodiment illustrated in FIG. 2 it is seated on the drive output part 16a, it being quite possible for it to extend right along the full length of the drive output part 16a.

In the working embodiment illustrated in FIG. 1 the coil means 38a is preferably radially within the peripheral wall 15a. It can be mounted on a slide sleeve 46a in order to provide a low-friction sliding contact area between it and the drive output part 16a.

The coil system 38a is to be supplied with switched exciting voltage or power. Such a driving voltage is supplied by way of electrical leads as indicated at 47a.

The two drive means 36a and 37a cooperate together with an electrodynamic action. The drive coils 42a are excited individually or in groups in a timed sequence, the magnetic field produced cooperating with the magnetic fields produced by the permanent magnet means 29a so that reaction forces are produced which drive the stators 4—dependent of the direction of magnetization in the one or the other direction. The reaction forces then constitute the above mentioned first setting force.

By mutually coordinated actuation of the two drive systems 6 and 7 it is possible for the first and second setting forces acting on the stator 4 to be varied and combined, something which renders it possible for the stator 4 to be utilized for example for long periods of time to convey or shift a heavy load or however to briskly accelerate the stator or to position it with high precision in desired positions.

The above mentioned electronic control means in this case control both the production of the fluid setting force and also of the electrodynamic setting force, a regulated manner of operation also being possible.

While in the working examples illustrated in FIGS. 1 and 2 the fluid setting force and the electrodynamic setting force act on one and the same component of the stator 4, and accordingly there is a highly integrated design, FIG. 3 shows a working embodiment of the invention, in the case of which the above mentioned setting forces act on separate components of the armature 4.

In FIG. 3 those components, which correspond to the components described for the specific account in FIGS. 1 and 2, are provided with the index letter "b" instead of the index letter "a". The preceding description applies to this extent also for the design illustrated in FIG. 3. In the following particularities of the construction of FIG. 3 will be explained which serve to distinguish same from the designs already described.

The linear drive device 1 illustrated in FIG. 3 comprises two separate drive output parts $16b_1$ and $16b_2$. These two drive output parts are respectively accommodated in a separate receiving space $12b_1$ and $12b_2$. They extend in parallelism to one another and are a component of the stator 2.

The first drive output part $16b_1$ belongs to the linear direct drive system 6. A first force output member $26b_1$ projects from it, which terminal extends from the stator 2.

The second drive output part $16b_2$ belongs to the fluid power drive system 7. It divides the receiving space $12b_2$ accommodating it into a first space part $17b_1$ and a second space $18b_2$. Starting from the second drive output part $16b_2$ there extends a second force output member $26b_2$ axially to the same side as the first force output member $26b_1$ and it extend like same terminally from the stator 2. Outside the stator 2 the two force output members $26b_1$ and $26b_2$ are joined together by means of a yoke means 48b in a secure manner so that they are drivingly or kinematically linked in the axial direction. The yoke means 48b has the attachment means 5 provided on it.

By activation of the linear direct drive system 6 an electrodynamically produced first setting force may be exerted on the first drive output part $16b_1$. By activation of the fluid power drive system 7 a second fluid-generated setting force may be applied to the piston-like second drive output part 16b2. Since both drive output parts are drivingly linked together and belong to the armature 4, the armature may accordingly be acted on by the two setting forces in a highly adjustable manner.

In the case of the linear drive device 1 of FIG. 3 there is in addition the provision of a more particularly tubular guide part 52b, which is also drivingly or kinematically coupled with the armature 4 and which plunges into a guide recess 53b in the stator 2 while being guided in a sliding manner.

Apart from the components of the linear direct drive system 6 the linear drive device illustrated in FIG. 3 may be identical to the device described in the patent publication WO 98/25032 A1. The description in this publication is included herein by reference.

What is claimed is:

1. In a linear drive device comprising a stator and an armature able to be moved linearly in relation to the stator and an electrodynamic linear direct drive system, composed of two drivingly cooperating drive means in the form of a coil means having a plurality of coaxially sequentially arranged drive coils and of a magnet means with one or more axially sequentially arranged permanent magnets, of which the one is arranged on the stator and the other is arranged on the armature and by which the armature may be subjected to a first setting force, the invention which resides in the provision of an additionally present fluid power drive system adapted to provide for fluid actuation of the armature for the production of a second setting force independent from the first setting force, and wherein the stator further includes a peripheral wall defining a receiving space in which a drive output part of the armature is arranged for linear movement, said peripheral wall having a longitudinal slot extending through it radially, such slot extending in the longitudinal direction in the receiving space, such slot furthermore having a force output member extending through it and being sealed in a fluid-tight manner on either side of the force output member by at least one sealing tape, and wherein the drive means on the stator side of the linear direct drive system is a component of a stator rod extending between the terminal portions of the receiving space and through the drive output part, the stator rod being surrounded by the drive output part in a sliding manner and with a seal.

2. The linear drive device as set forth in claim 1, wherein the armature possesses two drive output parts coupled drivingly in the axial direction, of which one possesses one of the drive means of the linear direct drive system and of which the other possesses at least one axially aligned actuating face for controlled fluid actuation.

3. The linear drive device as set forth in claim 2, wherein from the two drive output parts, to the same side, respectively at least one force output member extends, the force output members being kinematically coupled by a yoke means outside the stator with the formation of a force output unit.

4. The linear drive device as set forth in claim 3, comprising a guide part kinematically coupled with the force output unit and arranged to be guided in a guide recess in the stator, such unit being more especially tubular in form.

5. The linear drive device as set forth in claim 1, wherein the drive output part of the armature is provided with one of the drive means of the linear direct drive system and also has at least one axially aligned actuating face for controlled fluid actuation.

6. The linear drive device as set forth in claim 5, wherein the drive output part of the armature divides up the receiving space of the stator in a sealing fashion into two axially sequentially placed space parts, of which at least one is adapted for controlled fluid actuation.

7. The linear drive device as set forth in claim 6, wherein both such parts of the receiving space are adapted for controlled fluid actuation.

8. The linear drive device as set forth in claim 1, wherein the drive output part is piston-like in form.

9. The linear drive device as set forth in claim 1, wherein the force output member is kinematically coupled with the drive output part, which renders possible the output of force 1 outside the receiving space.

10. The linear drive device as set forth in claim 9, wherein at least one force output member is rod-like in form and extends axially away from the drive output part, it extending outwardly through the terminal wall on the stator side of the receiving space.

11. The linear drive device as set forth in claim 2, wherein the two drive output parts are arranged in two elongated separate receiving spaces, and wherein the drive output part having the at least one actuating face is piston-like in form and divides up its receiving space in a sealing manner into two axially sequentially placed space parts, of which at least one is designed for controlled fluid actuation.

12. In a linear drive device comprising a stator and an armature able to be moved linearly in relation to the stator and an electrodynamic linear direct drive system, composed of two drivingly cooperating drive means in the form of a coil means having a plurality of coaxially sequentially arranged drive coils and of a magnet means with one or more axially sequentially arranged permanent magnets, of which the one is arranged on the stator and the other is arranged on the armature and by which the armature may be subjected to a first setting force, the invention which resides in the provision of an additionally present fluid power drive system adapted to provide for fluid actuation of the armature for the production of a second setting force independent from the first setting force, wherein the armature possesses two drive output parts coupled drivingly in the axial direction, of which one possesses one of the drive means of the linear direct drive system and of which the other possesses at least one axially aligned actuating face for controlled fluid actuation, and wherein the two drive output parts are arranged in two elongated separate receiving spaces.

13. The linear drive device as set forth in claim 12, wherein the drive output part having the at least one actuating face is piston-like in form and divides up its receiving space in a sealing manner into two axially sequentially placed space parts, of which at least one is designed for controlled fluid actuation.

14. The linear drive device as set forth in claim 12, wherein the drive output part having the actuating face divides up its respective receiving space in a sealing fashion into two axially sequentially placed space parts, of which at least one is adapted for controlled fluid actuation.

15. The linear drive device as set forth in claim 14, wherein both such parts of the receiving space are adapted for controlled fluid actuation.

16. The linear drive device as set forth in claim 12, wherein the drive output parts are piston-like in form.

17. The linear drive device as set forth in claim 12, further comprising at least one force output member kinematically coupled with at least one drive output part, which renders possible the output of force outside at least one receiving space.

18. The linear drive device as set forth in claim 17, wherein the at least one force output member is rod-like in form and extends axially away from the drive output part, it extending outwardly through the terminal wall on the stator side of the receiving space.

19. The linear drive device as set forth in claim 17, wherein a peripheral wall of at least one receiving space has a longitudinal slot extending through it radially, such slot extending in the longitudinal direction of the receiving space, such slot furthermore having the force output member extending through it and being sealed in a fluid-tight manner on either side of the force output member by at least one sealing tape.

20. The linear drive device as set forth in claim 19, wherein the drive means on the stator side of the linear direct drive system is a component of a stator rod extending between the terminal portions of the receiving space and through the drive output part, the stator rod being surrounded by the drive output part in a sliding manner and with a seal.

21. The linear drive device as set forth in claim 12, wherein from the two drive output parts, to the same side, respectively at least one force output member extends, the force output members being kinematically coupled by a yoke means outside the stator with the formation of a force output unit.

22. The linear drive device as set forth in claim 21, comprising a guide part kinematically coupled with the force output unit and arranged to be guided in a guide recess in the stator, such unit being more especially tubular in form.

* * * * *